2 Claims. (Cl. 260—397.4)

This invention relates to new steroid compounds. More particularly, it relates to 3-hydroxy-1,3,5(10),15-estratetraen-17-one and intermediates.

The novel estrone of the present invention can be illustrated by the following structural formula:

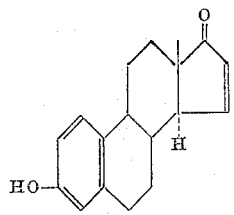

The above compound is a white crystalline solid. It is relatively insoluble in water but soluble in organic solvents such as methanol, ethanol, ethyl acetate, acetone and the like.

The steroid 3-hydroxy-1,3,5(10),15-estratetraen-17-one can be prepared in a three step process from 3-acetoxy-16-bromoestra-1,3,5(10)-trien-17-one which has been described in the prior art. The starting material described in the prior art is converted into the corresponding 17-ketal by heating with, for example, ethylene glycol which produces the corresponding ethylene ketal. The latter compound is then reacted with, for example, potassium t-butoxide to yield 17-ethylenedioxy-1,3,5(10),15-estratetraen-3-ol. The ethylenedioxy blocking group on the latter compound is then removed by hydrolysis to produce the desired 3-hydroxy-1,3,5(10),15-estratetraen-17-one.

The compound of the present invention is useful for its estrogen activity. It is also useful as an intermediate in the preparation of other 15-substituted estrones and estradiols such as those described in our copending applications Serial Nos. 147,149 and 147,151, filed October 24, 1961.

The following examples describe in detail the preparation of 3-hydroxy-1,3,5(10),15-estratetraen-17-one and intermediates.

EXAMPLE 1

Preparation of 17-Ethylenedioxy-1,3,5(10),15-Estratetraen-3-ol

A solution of 400 mg. of potassium in 20 ml. of t-butyl alcohol is evaporated and after the addition of 20 ml. of xylene the evaporation is repeated. A solution of 600 mg. of 17-ethylidenedioxy-16-bromo-1,3,5(10)-estratrien-3-ol in 40 ml. of xylene is added to the potassium t-butoxide and the mixture is heated under reflux in an atmosphere of nitrogen for 18 hours. Upon cooling, the mixture is diluted with ether, washed with saturated saline, dried and evaporated to give 275 mg. of a pasty solid which is crystallized from methanol to give 130 mg. of white crystals, melting point 215–219° C. Two additional crystallizations from acetone-petroleum ether gives the pure ketal tetraene, melting point 218–220° C.

EXAMPLE 2

Preparation of 16-Bromo-17-Ethylenedioxy-1,3,5(10)-Estratrien-3-ol

A solution of 1.2 g. of 16-bromoestrone acetate [N. S. Johnson et al., J. Am. Chem. Soc., 79, 2005 (1957)] and 220 mg. of p-toluenesulfonic acid monohydrate in 60 ml. of toluene and 5 ml. of ethylene-glycol is distilled slowly through a Vigreux column for 44 hours. (Total distillate 45 ml.) The reaction mixture is cooled, neutralized with saturated sodium bicarbonate solution diluted with ethyl acetate, washed with saturated saline, dried and evaporated. Crystallization of the crude residue from methanol gives 825 mg. of white crystals, melting point 234–236° C. Two further crystallizations from the same solvent gives the pure bromoketal, melting point 246–247° C.

EXAMPLE 3

Preparation of 3-Hydroxy-1,3,5(10),15-Estratetraen-17-One

A solution of 1.0 g. of 17-ethylenedioxy-1,3,5(10),15-estratetraen-3-ol and 60 mg. of p-toluene-sulfonic acid monohydrate in 70 ml. of acetone and 12 ml. of water is stirred at room temperature for 1.5 hours. The solution is then diluted with 350 ml. of ether, washed once with dilute sulfuric acid, once with dilute sodium bicarbonate solution and finally with saturated saline. After evaporation of the solvents, the resulting solid is crystallized from methanol to give 475 mg. of 15-dehydroestrone, melting point 249–251° C. Further crystallization of the product from methanol and from chloroform-methanol gives the pure sample, melting point 250–252° C.

We claim:

1. The compound 3-hydroxy-1,3,5(10),15-estratetraen-17-one.

2. A method of preparing 3-hydroxy-1,3,5(10),15-estratetraen-17-one which comprises heating 3-acetoxy-16-bromoestra-1,3,5(10)-trien-17-one and ethylene glycol in the presence of p-toluenesulfonic acid and toluene, heating the reaction product with potassium t-butoxide and subsequently treating the reaction product with p-toluenesulfonic acid monohydrate and water and recovering said product therefrom.

No references cited.